May 7, 1957 F. MULKA 2,791,017
SLIDING CLASP FASTENERS
Filed March 25, 1952

INVENTOR
Friedrich Mulka

---

2,791,017
SLIDING CLASP FASTENERS

Friedrich Mulka, Wewelsburg, uber Paderborn, Germany

Application March 25, 1952, Serial No. 278,389

Claims priority, application Germany April 3, 1951

11 Claims. (Cl. 24—205.13)

---

This invention relates to sliding clasp fasteners having fastener elements which are arranged in channels formed by the material of the fastener stringer and supported by stirrups.

In the known sliding clasp fasteners, the stirrups are made in one piece with the fastener elements and hold the stringer material, which may consist of fabric, rubber, leather, artificial leather or the like, in such manner that the front edge is so disposed beyond the centre of the closed fastener that the edges of the two halves of the fastener closely abut one another on closing. By this means, the difficulties in the manufacture of neatly closing or sealing sliding clasp fasteners, which definitely occur when using loose closing strips, are effectively overcome. The known sliding clasp fasteners of this kind, however, necessitate a complicated manufacturing process and addition the stringer material is subjected to high stresses so that this rapidly becomes worn. Finally, the support of the sealing edges, which are subjected to strong deformation due to bending stresses is not sufficient in every case, with the result that the sealing or closing edges gape open and an adequate closing action is no longer obtained.

The object of the invention is to provide a sliding clasp fastener of the type described in which the disadvantages of the known constructions do not arise. This is essentially achieved according to the invention by the fastener elements being embraced at their bases, with interposition of the fastener stringer, on both sides by projecting independently manufactured stirrups.

As a result of the stirrups being separated from the actual fastener elements, it is possible for these parts to be manufactured in a simple manner. Moreover, the material of the stringer is protected to a high degree since it is neither formed with apertures nor is it subjected to high stresses on small surfaces, such as is necessarily the case with the fastener elements secured in the usual manner. As the result of clamping the fastener elements in the material of the stringer by means of stirrups serving for the support of the sealing edges formed by the material, the largest possible surface is available for securing the fastener elements so that the stress per unit of area can be kept low. At the same time, a firm connection is thereby obtained between the fastener elements and the stirrups which is in no respect inferior as regards accuracy to that obtained with fastener elements which are made in one piece with the supporting stirrups, so that a good sealing action is obtained.

If the pressing of the material enclosed between the fastener elements and the stirrups—considered per unit of area—is to be kept particularly low, it is advisable to allow the fastener elements and the stirrups to interengage at least partially by means of projections and recesses associated with the said elements and stirrups. The shaped connection which can be obtained in this way has a very advantageous effect on the rigidity of the connection of the two parts and on the fastening to the material and is capable of being carried out in a simple manner in manufacture, in that, for example, the stirrups can be forced through in the manner of a punch upon being applied to the fastener elements placed in a fold of the material and thus produce a shaped connection in conjunction with the recesses provided in the fastener elements. Moreover, it is also possible, for example, to make the base part of the fastener elements in web form as a whole so that in coacting with stirrups which are formed as clamps on the inside, a shaped connection is produced by the material of the fastener stringer disposed between the two parts. Adjoining the web serving for the securing of such a fastener element is conveniently a neck portion which is narrower in breadth and width and which carries the head of the fastener element. The supporting surfaces serving to produce the locking action with the elements of the other side of the fastener in the closed position are advantageously arranged symmetrically to the longitudinal axis of the fastener elements and as far as possible at right-angles to the latter in order to obtain a uniform stressing of the binding. By this means, forces acting in the longitudinal direction of the fastener on the fastener elements or more especially on the last element which is in engagement at any time are then avoided. In the region of the supporting edges, the fastener elements are made particularly broad, in order to ensure a reliable fastening even when the fastener is subjected to strong bending stresses. For this purpose, the fastener elements are advantageously made roof-shaped on both sides in such manner that the edges formed by the intersecting inclined surfaces are disposed parallel to the supporting surfaces and, considered on one side, the one inclined surface extends over a part of the head of the fastener element and the other inclined surface extends over a part of the neck portion supporting the element head. The inclined surfaces of the other side of the fastener are for this purpose symmetrically disposed. In place of the inclined surfaces, there may be provided a vertical surface on at least one side. Finally, the desired width of the supporting surfaces may also be produced by broadening the fastener elements on one side. With a roof-shaped formation of the broadening of the fastener element, the edge which is formed by the intersecting inclined surfaces may also be replaced by a surface to which the roof-shaped surfaces are connected.

For the purpose of producing an easy movement of the fastener with a slight spreading of the two rows of fastener elements by the slide member, it is recommended that the head of the fastener element be made triangular in such manner that the base is located symmetrically in relation to the neck portion. The two limbs may in such case be straight or curved.

The stirrups clamping the fastener elements with interposition of the material of the stringer are advantageously given a substantially rectangular basic form with strongly rounded edges—seen in the longitudinal direction of the fastener—and their surfaces which form the channel enclosing the fastener elements are advantageously disposed substantially parallel to the inclined surfaces associated with the neck portions of the fastener elements. Independently of the size of the angle enclosed between the inclined surfaces of the fastener elements and the longitudinal axis of the latter, the said inclined surfaces may expediently be employed for guiding the slide member used for operating the fastener. In this manner, it is possible to keep the slide member very small and in addition to ensure the maximum useful life of the fastener, since the forces which arise with the operation of the fastener are then directly taken up at the parts at which they occur. By this means, the securing effect in the material of the stringer is above all improved.

Those edges of the back parts of the stirrups which adjoin one another may also be arranged at an inclination to the longitudinal direction of the fastener in such manner that an uninterrupted sliding path for the slide member guided on these parts of the stirrups, despite the existence of spaces separating the individual stirrups, such path permitting a particularly uniform movement of the slide member. The inclined position of those side faces of the stirrups which are adjacent one another with respect to the longitudinal direction of the fastener could, for example, also be achieved by making the rear or back portions in the form of arrow heads.

The fastener elements and/or the stirrups serving for the clamping thereof and for supporting the material of the stringer which is folded channel-fashion around the row of fastener elements may, in the fastener according to the invention, be formed on their surfaces facing the adjacent parts with small projections extending from lengths of the individual elements or stirrups formed of shaped bars prepared for this purpose and if necessary connected as a whole with the material.

In order that the invention may be more readily understood, reference is made to the accompanying drawings, which illustrate diagrammatically and by way of example several embodiments thereof, and in which.

Figure 1:
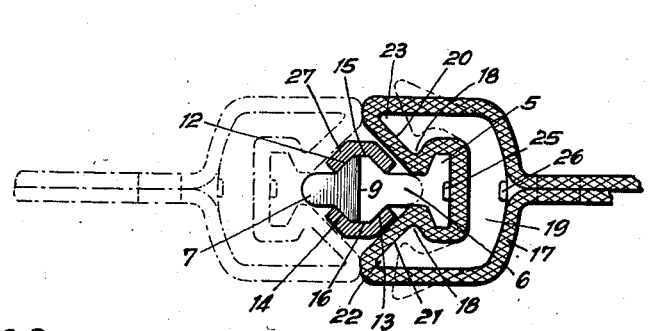
Figure 1 is a section through one side of a sliding clasp fastener, the other side of the fastener being indicated in chain-dotted lines.

The fastener elements (Figures 1 and 2) comprise a web-like base 5 which is followed by a neck 6 of smaller breadth and width, the said neck carrying a head 7 of the fastener element, and providing a reentrant portion between the head and the base. The base 5 may have its upper surfaces inclined, if desired, as shown in Fig. 1. Such construction facilitates tight gripping of the fabric about the base and reduces tendency to sheer the fabric as the stirrups or C-clamps are applied to clamp it about the base 5. The head 7 is approximately in the form of an equilateral triangle and is so positioned on the neck 6 that its base is disposed symmetrically of the longitudinal axis of the fastener element and forms with its two ends the supporting surfaces 8 and 9 which effect the locking of the closed fastener. The two lateral surfaces 10 of the triangular fastener head 7 are arranged symmetrically of one another in relation to the longitudinal axis of the fastener element and have a slightly concave curvature.

In cross section, the fastener elements are made particularly broad in the region of the supporting surfaces 8 and 9. For this purpose, the fastener elements are here given a roof-like shape on both sides in such manner that the inclined surface 11 of one side is extended to a part of the neck 6 and the other inclined surface 12 of the same side includes a part of the surface of the head 7 of the fastener element. The inclined surfaces 11 and 12 and these inclined surfaces 13 and 14 on the other side of the fastener which are symmetrical with respect to the surfaces 11 and 12 are defined by narrow surfaces 15 and 16 disposed parallel to the plane of the fastener element. The cut edges between the surfaces 15 and 16 with the inclined surfaces 11, 12 and 13, 14 are disposed approximately at the level of the supporting surfaces 8 and 9. The position thereof may be different to adapt it to actual conditions.

The fastener stringer material 17, which may either comprise a separate strip of material or comprise the edges of the actual material to be connected by means of the sliding clasp fastener, is folded around the web 5 of the fastener element and the part of the neck 6 adjoining it and is held in this position by the inwardly directed, rounded edges 18 of a stirrup 19. The stirrup has inclined surfaces 20 and 21 which commence at the edge 18 and which are disposed substantially parallel to the inclined surfaces 11 and 13 of the heads of the fastener elements. The inner surface of the stirrup which connects the inclined surfaces 20 and 21 may, if desired, be roughened. The inclined surfaces 20 and 21 continue in the outward direction to form supporting edges 22 and 23 which project so far towards the centre line of the fastener that the fastener stringer supported by them projects slightly beyond the centre of the fastener.

In the embodiment illustrated in Fig. 1, the fastener stringer 17 is folded over the rear or outer edges of the stirrups 19 and its free end is sewn to the web of material supporting the fastener. When using suitable material, the end may be stuck or soldered.

The web 5 of the fastener element is formed on its end surfaces 24 facing the adjoining fastener element with short projections 25, the end faces of which are formed by interruption surfaces. The end faces of the stirrups 19 also carry short interruptions projections 26.

Finally, the slide member 27 is guided on the inclined surfaces 11, 12 and 13, 14 of the fastener elements, said slide member only being shown in section in the drawing since it may follow known constructions in other respects.

Figures 3A, 3C:
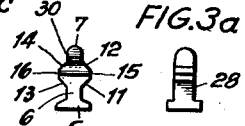
Figures 3a, 3b, and 3c show, respectively a side elevation and front elevation of a shaped bar formed of connected fastener elements and also a side elevation of a shaped bar used for the fastener illustrated in Figures 1 and 2.

Before the clamping of the fastener elements, the stirrups 19 have a shape corresponding substantially to that indicated in Figure 3c and in dotted lines in the Figure 1. They may either be manufactured in this shape by swarfless shaping or machining or they can be bent out of substantially flat parts.

Figure 3B:
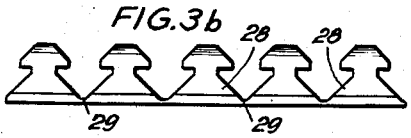

Figures 3a and 3b show a shaped bar formed from fastener elements 28, said elements only being connected together at webs 29 which form the bases so that they are ready for easy breaking off, stamping out or any other separation. The construction shown in Figure 3c and indicated at 30 corresponds to the fastening elements employed for the fastener according to Figures 1 and 2.

Figures 3D, 3F:
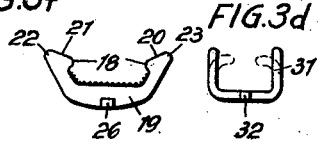
Figures 3d, 3e and 3f show, respectively, similar views of a bar forming the stirrups and the profile of the bar used for the stirrups in the fastener shown in Figures 1 and 2.
Figure 3E:
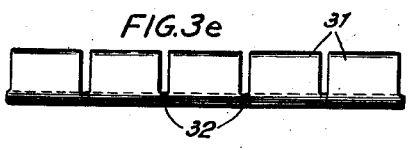

Figures 3d and 3e show the corresponding views of the stirrups. The individual stirrups 31 are joined together at the points 32 which are also prepared for easy separation and the connecting points 32 can be separated into individual sections by breaking off, stamping, bending or the like during or after being fitted to the material forming the stringer of the fastener. The stirrups can obviously have the cross-sectional shape indicated in dotted lines in Figure 3d, or the shape employed in Figures 1 and 2, as indicated in Figure 3f.

Figure 2:
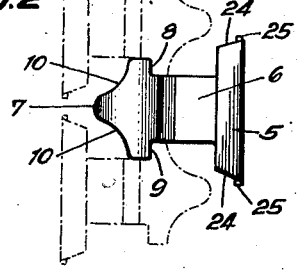
Figure 2 is a plan view of a fastener element, the elements engaging it in the closed position being shown on each side in chain-dotted lines.
Figure 4A:
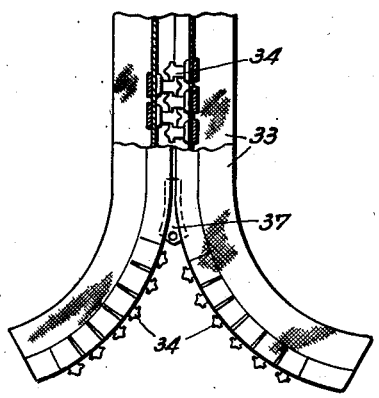
Figure 4a is a plan view of a sliding clasp fastener of a construction differing from that according to Figures 1 and 2.
Figure 4B:
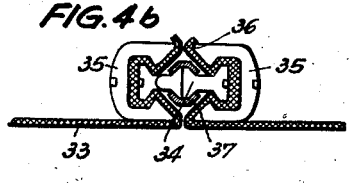
Figure 4b is a cross-section of the fastener of Figure 4a drawn on a larger scale.

The sliding clasp fastener shown in Figures 4a and 4b represents a modified construction of that shown in Figures 1 and 2. The fastener stringer 33 is in this case only clamped between the fastener elements 34 and the stirrups 35 and forms by means of its edge located at the level of the pressure edges 36 a sealing or closing surface against which the corresponding edge of the other side of the fastener bears in a sealing manner when the fastener is closed. As in the embodiment illustrated in Figures 1 and 2, the slide member is guided directly on the inclined faces of the heads of the fastener elements. With sliding clasp fasteners constructed in this manner, the stirrups 35 are freely visible but they have the advantage of being completely flat on one side.

The connection of the fastener elements with the material 17 of the fastener stringer by clamping is very reliable, as more particularly shown in Figure 1, and ensures the maximum protection of the material since this has no holes made therein nor can it be damaged by high pressures acting on small surfaces, for in contrast to the known methods of fixing used in sliding clasp fasteners, the fastening means in accordance with the invention provides a shaped connection acting on large surfaces, since the edges 18 of the stirrups 19 and the webs 5 of the fastener elements are of great length. In combination with the reliable fastening of the fastener elements, a reliable support of the sealing or closing edges of the material of the stringer in the region of the edges 22 and 23 is ensured, so that these edges reliably bear in a sealing manner one upon the other when the fastener is closed. The stirrups 19 may be of such dimensions with respect to the position of their edges 22 and 23 that the initial tension with which the sealing edges bear one against the other can be given any desired value. By this means, it is possible readily to adapt them to the different types of materials used for the stringers.

Figure 5:
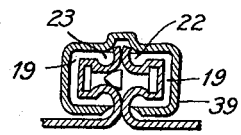
Figure 5 is a similar cross section employing an external slider.

The construction of the supporting surfaces 8, 9 of the fastener elements as particularly wide surfaces in combination with the relatively flat front parts of the heads 7 of the fastener element, which heads lie between the neck portions 6 of the oppositely disposed row of fastener elements to which the stringer tape is clamped and are centered by the tape, reliably prevents an unintentional opening of the fastener under the action of bending stresses without restricting the capacity of the fastener to change in shape. With the advantageous construction of the supporting surfaces 8, 9 of the fastener elements, there is simultaneously provided a possibility of employing a particularly small slide member for actuating the fastener. It is possible also to employ a slide member of the type disclosed in Mulka Patent No. 2,124,206 and in my copending application Ser. No. 200,663, filed December 13, 1950, which embraces the fastener from the outside. As shown in Figure 5, this can be achieved more especially if the material of the stringer is led on one side only as far as one edge 22 or 23 (compare also Figure 4b) so that the backs of the stirrups 19 are free to support the slide member 39 sliding on the said stirrups as shown in said copending application and in Figure 5, herein. In this connection, it is possible to have a particularly easy movement of the slide member if the edges of the rear parts of the stirrups are disposed at an inclination to the length of the fastener, since the latter is then given an uninterrupted path.

A fastener covered on only one side is also shown in Figure 4a and Figure 4b. It will readily be seen that this can also be made completely closed, since in this case also the fastener elements themselves are covered on both sides, so that the sealing pressure cannot be reduced by deformations acting on the fastener, since the support is obtained on both sides of the fastener.

The method of manufacture described with reference to Figures 3a and 3b and advantageously to be carried out by means of rotating pressure rollers has the advantage, as compared with the usual methods of securing the fastener elements to the material of the fastener stringer, that it is capable of being effected with comparatively simple machines and that spacing errors are positively avoided. Moreover, since the parts of the fastener during the fixing thereof are reliably held by the mutual connection in the shaped bars, the fasteners manufactured in this manner have the advantage of a particularly uniform movement. Furthermore, the fastener elements may, by means of the process in accordance with the invention, also be secured directly to the webs of material to be joined without any difficulty. This renders it unnecessary for special strips to be used and the appearance of the garments equipped with the fastener is improved.

As already mentioned, the embodiments illustrated are only given for the purpose of explaining the invention and the latter is not restricted to these embodiments. As regards the shaping of the individual parts and the methods used for their manufacture, many modifications are possible. Moreover, the method of arranging the fastener elements on the stringer can be varied. The stirrups clamping the fastener elements on the material of the stringer may with advantage be at least partially roughened on their faces which are towards the fastener elements. For this purpose, it is possible, for example, to provide an embossing or knurling. Finally, sufficient friction may be obtained if the surfaces are provided with projections in the region of their lateral boundary surfaces by depressions impressed therein from the side.

The possibility of connecting the fastener elements and/or the stirrups to the material in the form of rods or bars shaped ready for use and with the prepared separations and of carrying out at the same time or subsequently the separation of the individual elements is not a necessary feature of the fastener according to the invention. The fasteners may, if desired, be continuously and separately included in the material in a manner known per se.

I claim:

1. A slide fastener strip comprising a pair of stringer tapes in closed position lying in face to face contact along an edge thereof and at a region spaced from said edge, said tapes being folded to form channels opening toward each other between said edge and said region, rows of fastening elements having heads interengaging along a predetermined line and having shanks and bases positioned within said folds, individual stirrup members externally embracing said folds and clamping the same to the shanks and bases of individual fastening elements for anchoring said stirrups and elements individually to said folds in fixed relation, said stirrups having open ends engaging said face contacting stringer edges and regions and compressing the same between said ends on both sides of the interengaging fastening elements in the closed position of the fastener.

2. A slide fastener comprising, in combination, a pair of opposed stringer tapes each formed with a longitudinal fold spaced from the edge thereof, a row of fastener elements assembled with each of said stringer tapes, each fastening element having a locking portion adapted to cooperate with the locking portion of an opposing element and an attaching portion located within the fold of the tape; a row of clamping elements associated with each of said stringer tapes, each clamping element corresponding to one fastening element and embracing the outside of a fold in that region thereof where the attaching portion of the corresponding fastening element is located within the fold and firmly clamping the fold to said portion of the element; said clamping elements having terminal end portions facing the locking portions of said elements and spaced from the plane of interengagement of said locking portions by distances less than the thickness of the stringer tapes; said stringer tapes being bent outwardly across the facing end portions of the clamping elements at both sides of the rows of fastening elements and being compressed against each other in face-to-face relationship on both the near and far sides of the fastening elements in the closed position of the fastener; and a slider cooperating with said fastening elements for connecting and disconnecting the fastening portions thereof and thereby closing and opening the slide fastener.

3. A slide fastener consisting solely of two stringer tapes of uniform thickness, two rows of fastening elements, two rows of clamp elements and a slider; said fastener elements having interlocking heads of approximately isosceles trapezoidal longitudinal cross section with narrow shanks extending from the bases thereof and with longitudinally widened foot sections carried thereby and being assembled in rows with their heads and foot sections mutually spaced; said rows of fastener elements having their foot and shank sections embraced within longitudinal folds of the stringer tapes with the stringer material projecting beyond the bases of the trapezoidal heads of the fastener elements; said rows of clamp elements embracing the folds in said tapes and clamping said folds about the foot and shank portions of said fastener elements, and being mutually spaced in alignment with the mutual spacings of said foot sections; said foot and clamping elements having interengaging portions locking the same in fixed relation to said folded tapes; said clamping elements having terminal ends spaced from the base planes of said trapezoidal heads by distances less than the uncompressed thickness of the tapes; said tapes being bent outwardly across the facing end portions of the clamping elements at both sides of the rows of fastening elements and being compressed together on both the near and far sides of the fastening elements in the closed position of the fastener; and said slider cooperating with said fastening elements for bending the stringer tapes between the clamping elements and moving the heads of each row of fastening elements into the longitudinal fold of the opposed stringer tape and between the shanks of the companion row of fastener elements for closing the fastener and for reversing the operation for opening the fastener.

4. A sliding clasp fastener according to claim 3, in which the areas of the stirrups that clamp the stringer material to the longitudinally directed sides of the shank portions are wider than said shank portion and back-up the stringer material between said shank portions, and in which the fastener elements have projecting centrally above their head portions relatively thin nose portions that enter between the backed up areas of the opposing stringers in the closed position of the fastener.

5. A method of manufacturing slide fasteners that comprises forming a shaped bar with a cross section corresponding to the cross section of a fastener element, partially severing the shaped bar into fastening elements having head, shank and foot portions and linked together by easily severed connections at their foot portions; forming a shaped bar with a cross section corresponding to the cross section of a closable stirrup, partially severing said bar into stirrups linked together by easily separable connecting portions, laying a stringer strip in the unsevered stirrup bar, feeding a fastening element from the fastening element bar to and placing the foot thereof in the so laid stringer strip in alignment with a stirrup element embracing the same, closing the stirrup element and stringer strip about the base of the fastening element to secure the same in the stringer strip, and thereafter severing the connecting portion between the closed stirrup element and the next stirrup element.

6. A slide fastener comprising, in combination, a pair of opposed stringer tapes, each tape being formed with a longitudinal fold; a row of rigid fastening elements associated with each of said stringer tapes; each rigid fastening element having a locking portion to lockingly engage with the locking portion of an opposed fastening element, a rigid attaching portion located within the longitudinal fold of the tape, and a rigid neck portion extending therebetween, said rigid neck portion being narrower, transversely of the fold, than said attaching portion; a row of rigid stirrup elements associated with each of said stringer tapes, each rigid stirrup element corresponding to one of said fastening elements and embracing the outside of the fold in that region thereof where the attaching portion of the corresponding fastening element is located within the fold; each rigid stirrup element being substantially C-shaped and surrounding and clamping said fold about the attaching portion of the corresponding fastener element, and having inwardly projecting portions clamping said fold tightly to said thinner neck portion thus fixedly clamping said rigid fastener element and said stirrup to said stirrup tape; each row of stirrup elements having open ends lying in opposed relation to the open ends of the other row of stirrup elements at each side of said rows of fastening elements, said opposed ends of said rows of stirrup elements being spaced from each other, when the fastener is closed, by a distance less than the uncompressed thickness of the two stringer tapes, and said stringer tapes being compressible and extending between the opposed ends of said rows of stirrup elements on both sides of said rows of fastening elements when the fastener is closed and thereby being compressed and clamped between said opposed stirrup ends in face-to-face relation at each side of the closed fastener.

7. A slide fastener according to claim 6; each of said C-shaped stirrup elements having a base portion and two arm portions extending from one side thereof, said arm portions having inwardly projecting ridge shaped portions for clamping said stringer tapes to said neck portions and outwardly flaring end portions, spaced further from their base portions than are said ridge portions, for cooperating with like end portions of an opposed stirrup element for compressing the stringer tapes as aforesaid.

8. A slide fastener comprising two rows of fastener elements, the fastener elements of each row being unitary bodies having generally rectangular base portions, narrower neck portions, and head portions having interengageable abutment faces, the fastener elements of each row being arranged with their rectangular bases longitudinally aligned and with their heads positioned to enter between the heads of the other row of fastener elements for engaging their abutment faces with the abutment faces thereof, a stringer tape extending along each row of fastener elements and folded longitudinally to embrace the aligned bases thereof, and a C-shaped clamping stirrup for each fastener element extending around the fold in the stringer tape and clamping the stringer tape about the bottom and sides of the base of said fastener element and having blunt inwardly projecting ribs clamping the stringer tape against the narrower neck of said fastener element adjacent its base thus fixedly securing itself and said fastener element in position on said tape.

9. A slide fastener according to claim 8, said stringer tapes being compressible and said C-shaped clamping stirrups having blunt pressing tips extending beyond said inwardly projecting ribs toward the heads of said fastener elements and terminating in planes spaced from the planes of the abutment faces thereof by distances less than the uncompressed thickness of a stringer tape, said compressible stringer tapes having marginal portions extending from the portions thereof clamped to said necks outwardly across said pressing tips on both sides of the rows of fastener elements so that the marginal portions of the two tapes are compressed together by said pressing tips on both sides of the rows of fastener elements when the abutment faces of the rows of fastener elements are interengaged.

10. A slide fastener according to claim 8, having a slider embracing the two rows of clamping stirrups and acting therethrough to bend the tapes between adjacent stirrups and fastener elements to swing apart the heads of the rows of fastener elements to enable them to be interengaged, said heads being generally roof shaped with overhanging eave portions affording the abutment faces thereof and with upwardly tapering portions extending from said eave portion toward a peak, the upwardly tapered portions of the heads of said fastener elements being concavely curved to accommodate the arcuate movements imparted to the heads of said fastener elements as the tapes are bent by said slider.

11. A slide fastener according to claim 9, said C-shaped clamping stirrups having outwardly flaring faces connecting their inward projections and their pressing tips, and said fastener elements having lateral eave portions extending outwardly beyond the sides of the cross-section of said neck portion, the marginal portions of each stringer tape being positioned between the lateral eave portions and the outwardly flaring portions respectively of the fastener elements and stirrups clamped thereto and forming between said marginal portions an outwardly flaring channel mouth for guidingly receiving the heads of the other row of fastener elements, the heads of said fastener elements being tapered upwardly from their lateral eave portions toward their peaks to enter and be guided into interengaging position by said channel mouths.

References Cited in the file of this patent

UNITED STATES PATENTS

| | | |
|---|---|---|
| 1,387,124 | Carr | Aug. 9, 1921 |
| 1,719,856 | Sipe | July 9, 1929 |
| 1,731,667 | Johnson | Oct. 15, 1929 |
| 2,017,603 | Winterhalter | Feb. 23, 1937 |
| 2,124,206 | Mulka | July 19, 1938 |
| 2,242,967 | Carlile | May 20, 1941 |
| 2,252,305 | Puschner | Aug. 12, 1941 |
| 2,255,183 | Ostwald | Sept. 9, 1941 |
| 2,283,590 | Sundback | May 19, 1942 |
| 2,421,323 | Fruengel | May 27, 1947 |
| 2,490,864 | Engel | Dec. 13, 1949 |
| 2,496,926 | Winterhalter | Feb. 7, 1950 |

FOREIGN PATENTS

| | | |
|---|---|---|
| 585,731 | Germany | of 1933 |